US012804164B2

(12) United States Patent
Chen

(10) Patent No.: US 12,804,164 B2
(45) Date of Patent: Nov. 17, 2026

(54) METHODS FOR VIDEO ENCODING IN LOW-LATENCY STREAMING

(71) Applicant: Adeia Guides Inc., San Jose, CA (US)

(72) Inventor: Tao Chen, Palo Alto, CA (US)

(73) Assignee: ADEIA GUIDES INC., San Jose, CA (US)

( * ) Notice: Subject to any disclaimer, the term of this patent is extended or adjusted under 35 U.S.C. 154(b) by 172 days.

(21) Appl. No.: 18/933,663

(22) Filed: Oct. 31, 2024

(65) Prior Publication Data

US 2026/0122249 A1 Apr. 30, 2026

(51) Int. Cl.
*H04N 19/159* (2014.01)
*H04N 19/172* (2014.01)

(52) U.S. Cl.
CPC ......... *H04N 19/159* (2014.11); *H04N 19/172* (2014.11)

(58) Field of Classification Search
CPC .. H04N 19/159; H04N 19/172; H04N 19/109; H04N 19/164; H04N 19/166; H04N 19/177; H04N 19/65; H04N 19/105
See application file for complete search history.

(56) References Cited

U.S. PATENT DOCUMENTS 12,549,739 B2 2/2026 Phillips
2008/0181302 A1* 7/2008 Demircin ............ H04N 19/177 375/240.06
2017/0238022 A1 8/2017 Kottana et al.
2021/0400233 A1* 12/2021 Li ............................ H04N 5/77
2024/0171741 A1 5/2024 Chen et al.

FOREIGN PATENT DOCUMENTS

EP 0902593 B1 11/2006

OTHER PUBLICATIONS

Carreira, J., et al., "Reference picture selection using checkerboard pattern for resilient video coding," Proc. IEE VCIP (Dec. 2015).
Maung, Htoo Maung, et al., "Hierarchical-P Reference Picture Selection Based Error Resilient Video Coding Framework for High Efficiency Video Coding Transmission Applications," Electronics 2019, 8, 310 (Mar. 11, 2019).
Optimized Fast Video Frame Repair for Extreme Low Latency RTP Delivery, U.S. Appl. No. 18/622,467.

* cited by examiner

*Primary Examiner* — Sath V Perungavoor
*Assistant Examiner* — Tyler B Edwards
(74) *Attorney, Agent, or Firm* — HG LAW LLP

(57) ABSTRACT

Systems and methods for encoding data for low-latency streaming are disclosed herein. The system encodes a plurality of frames of a video. The encoded frames of the video comprise at least one intra-coded key frame and at least one inter-coded frame. A subset of the plurality of encoded frames, along with a corresponding identifier for each frame in the subset, is added to a reference frame data structure. The system encodes a first frame as a first inter-frame referencing at least one encoded frame from the data structure and determines, based at least in part on properties of a stream, a probability of the first inter-frame being dropped during at least one of transmission or decoding. Based on the calculated probability, the system omits the first inter-frame from the data structure and encodes a second frame subsequent to the first frame using the data structure that omits the first inter-frame.

20 Claims, 8 Drawing Sheets

METHODS FOR VIDEO ENCODING IN LOW-LATENCY STREAMING

BACKGROUND

The present disclosure is related to systems and methods for encoding video frames for a low-latency streaming environment.

SUMMARY

Low-latency delivery of content is important for various use causes including for cloud-rendered content that is highly interactive, such as content in online or cloud gaming, esports, virtual reality (VR), augmented reality (AR), and extended reality (XR), including cloud-rendered virtual reality VR applications, VR foveated rendering, video-enabled remote device control (e.g., for operating machinery, medical devices, or for emergency response situations), and for many other cloud interactive applications. In these low-latency cases, both the encoder and decoder may run with virtually no buffer, meaning the frame is decoded and rendered as soon as all the packets for the frame have arrived at the client device. This need for real-time video processing transforms cloud gaming. for instance, into a race of milliseconds with minimal room for error. In many low latency cases, increased latency or discontinuity could make the system inoperable or unsatisfactory for its intended function or purpose. For example, missing frames for a video game feed may result in decreased performance (e.g., user game inputs do not match with what is currently being displayed).

Video encoding and video compression involves encoding frames into group of pictures (GOP) structures that include at least one intra-coded frames (I-frames) followed by predictive frames (P-frames), and/or bi-directional predictive frames (B-frames). I-frames are encoded independently of other frames, which means that the entire frame is encoded as-is, resulting in a larger file size and less compression. P-frames and B-frames are both encoded to store only the differences between the current frame and their reference frames, leading to smaller file sizes and better compression. P-frames reference previous frames while B-frames can reference both previous and subsequent frames. For common GOP structures such as IPPP and IBBP, all frames after the initial I-frame are encoded as P-frames or B-frames that reference other frames.

Because of this dependent encoding structure, a frame drop (e.g., the failure to present a frame during video playback due to a decoding issue and/or packet transmission loss) can impact any frames that reference it. Thus, if one frame drops, this error can propagate through an entire sequence of frames, potentially causing corrupted frames, lower frame rates, and frozen video playback. In the context of cloud gaming, where minimal latency is critical for synchronizing inputs with on-screen actions, these frame-drop issues can severely disrupt the system's performance, overall stream stability, and the overall user experience. Accordingly, there is a desire for a solution for addressing video playback issues caused by potential frame drops while still maintaining a low-latency streaming environment.

In one approach, when packet loss occurs or packets do not arrive in time, the system has the option to retransmit the dropped or corrupted packet. This solution requires a buffer to contain frames yet to be displayed that can be used while the dropped or corrupted packet is retransmitted. However, in a low-latency streaming environment with little to no buffer, the frames in the buffer will be exhausted before the frame is retransmitted and decoded. Therefore, re-transmitting the packet will result in the packet arriving too late for the frame to be displayed in time, resulting in an increased delay in video playback, or if discarded in decoding, a continuous corruption of all frames following the corrupted frame.

In one approach, a decoder will automatically move to decoding the next available I-frame, instead of decoding any frames that referenced a frame whose corresponding packets were lost or delayed in transmission. This approach is commonly known as reference frame invalidation. Reference frame invalidation effectively resets the reference chain, thereby preventing any displaying of a corrupted sequence of frames or freezing of frame playback. While this technique allows for the decoder to quickly recover from a detected error, it also comes with several downsides for a standard stream and a low-latency stream especially. First, reference frame invalidation will cause a noticeable visual gap in the video due to skipping several frames. To mitigate the visual gap, a stream could increase the frequency of I-frames; however, since I-frames are usually larger in size, this would require the stream bitrate to increase, which itself would increase the risk of packet loss. A solution that increases the likelihood of more frame drops can therefore not be the sole solution for low-latency streams. There, therefore, is a need for a solution that helps to prevent error propagation caused by dropped or corrupted frames while still maintaining a low-latency streaming environment.

To address these problems, methods and systems are disclosed herein for encoding data for low-latency streaming. The system encodes a plurality of frames of a video including at least one intra-coded key frame and at least one inter-coded frame. For each encoded frame of a subset of the plurality of encoded frames of the video, the system adds a respective identifier to a referencing data structure that is later used during the encoding process to select reference frames. For instance, when encoding the first frame as a first inter-frame, the first inter-frame references at least one encoded frame of the reference frame data structure. The first frame may correspond to any frame within the video frame. In some embodiments, the system determines, based at least in part on properties of a stream, a probability of the first inter-frame being dropped during at least one of transmission or decoding. Based on the determined probability of the first inter-frame being dropped, the system causes the first inter-frame to be omitted from the reference frame data structure, therefore making it ineligible to be a reference frame for encoding subsequent frames. The system then encodes a second frame of the video that is subsequent to the first frame by encoding the second frame as a second inter-frame, such that the second inter-frame references at least one encoded frame of the reference frame data structure that omits the first inter-frame. If the encoder were configured to process frames using a default configuration (i.e., not using disclosed techniques), it would encode the second frame using a reference frame data structure that may include the first inter-frame.

Such aspects establish a preventive approach to encoding video frames for low-latency streaming. By identifying frames that exhibit a particular probability of a frame drop, the system can proactively remove the identified frames from the reference frame data structure. Since the system does not include frames exhibiting a high risk of being dropped in the reference frame data structure, the described system and methods are able to mitigate the potential error propagations caused by a frame drop that could have occurred had those high-risk frames been used as reference frames. Whereas the aforementioned example approaches include side-effects such as latency spikes and/or an increase in the stream bitrate, the disclosed preventive approach is focused on using frame loss probabilities to optimize the encoder's reference frame data structure, all of which has no effect on the latency or bitrate of the stream transmitting the encoded video. For example, if a high-risk frame is dropped and the five subsequent frames depend on image data of the dropped frame, the decoder will be unable to properly process all five of these subsequent frames. With this solution, the frames are preventively encoded to not reference a frame that has been deemed a high-risk of dropping. Therefore, when the high-risk frame is dropped, the five subsequent frames can be decoded, and the video stream can continue without any effects on the stream latency.

In some instances, the system adds the plurality of encoded frames of the video to the stream, including the first inter-frame and the second inter-frame. The particular stream is transmitted to a decoder.

In some approaches, determining the probability of frame loss for a particular encoded frame includes determining current network conditions of a network that is transporting the stream and determining a frame size threshold based on current network conditions. The system then compares the size of the particular encoded frame to the frame size threshold and, based on the size of the particular encoded frame exceeding the frame size threshold, the system predicts that the particular encoded frame will be lost, or arrive late, during at least one of the transmission or the decoding of the encoded frame.

In such aspects, the system can then omit that particular encoded frame from the reference frame data structure based on the determined probability, therefore preventing subsequent frames from referencing it. Thus, there is no possibility that the transmission, decoding, and/or displaying of the subsequent encoded frames is affected by the potential frame loss. Without any possibility of an error propagation caused by the particular encoded frame, the displayed video is unlikely to experience prolonged frame corruption or freezing, even if frame loss occurs.

In some embodiments, the methods and systems further disclose comparing a size of the second inter-frame to the frame size threshold. In some embodiments, the size of the second inter-frame also exceeds the frame size threshold, and the system therefore predicts that the second inter-frame will also be dropped during at least one of the transmission or the decoding of the second inter-frame. In such embodiments, in response to the prediction, the system encodes a third frame that is subsequent to the second frame as an intra-frame.

In such aspects, the system is configured to detect instances where it may be appropriate to encode a frame as an intra-frame rather than preventively encoding the frame based on an optimized reference frame data structure. For example, if the encoder determines that multiple frames in a row have a high risk of being dropped, it is unlikely that the encoder can reconcile these cascading issues using the disclosed preventive encoding method. In such embodiments, the encoder therefore decides to encode one of the multiple frames as an intra-frame to create a new stable reference point.

In some approaches, the first inter-frame is omitted from the reference frame data structure based on determining a probability that at least one of the transmission or decoding of the first inter-frame will be delayed. A frame that has any of its packets experience a delay during transmission has a high probability of not being decoded in time. The decoder may therefore drop a frame that has experienced a transmission delay. Even if all packets of a frame arrive in time, a particularly large frame may take too long to decode. In some embodiments, the decoder will drop the frame during the decoding process if it determines that the frame cannot be decoded in time. The probability of a transmission or decoding delay can, therefore, also be used to determine whether the first inter-frame should be omitted from the reference frame data structure.

In some instances, the referencing data structure is a reference frame buffer comprising each frame of the subset of the plurality of frames and the respective identifier of each of the plurality of the frames. Thus, when an encoder references the reference frame buffer, the encoder is configured to parse the respective identifiers for suitable reference frames and can then efficiently access the particular frame from the buffer. In some embodiments, the frames in the reference frame buffer are decoded frames.

In some embodiments, the at least one intra-coded key frame is an I-frame, and the at least one inter-coded frame is at least one of a P-frame or B-frame. For example, I-frames, P-frames, and B-frames are used by video compression standards such as H.26x standards, the MPEG standards, AV1 or any other suitable video compression standard.

In some approaches, in response to determining, based at least in part on the properties of the stream, the probability of the first inter-frame being lost during at least one of the transmission or the decoding of the first inter-frame, the system assigns an identifier to the first inter-frame indicating that it is unavailable to be used as a reference frame for subsequent frame encodings.

In such aspects, a frame that is likely to be lost can be excluded from being used as a reference frame even if it is included in a referencing data structure. For example, an encoder may include all frames in a buffer after completing the encoding and decoding of those frames. In this approach, rather than excluding certain frames from the buffer, the encoder is enabled to mark the particular frames with an identifier indicating that the particular frame should not be used as a reference frame.

In some embodiments, the subset of the plurality of the encoded frames of the video includes encoded frames that have been determined to be suitable reference frames.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
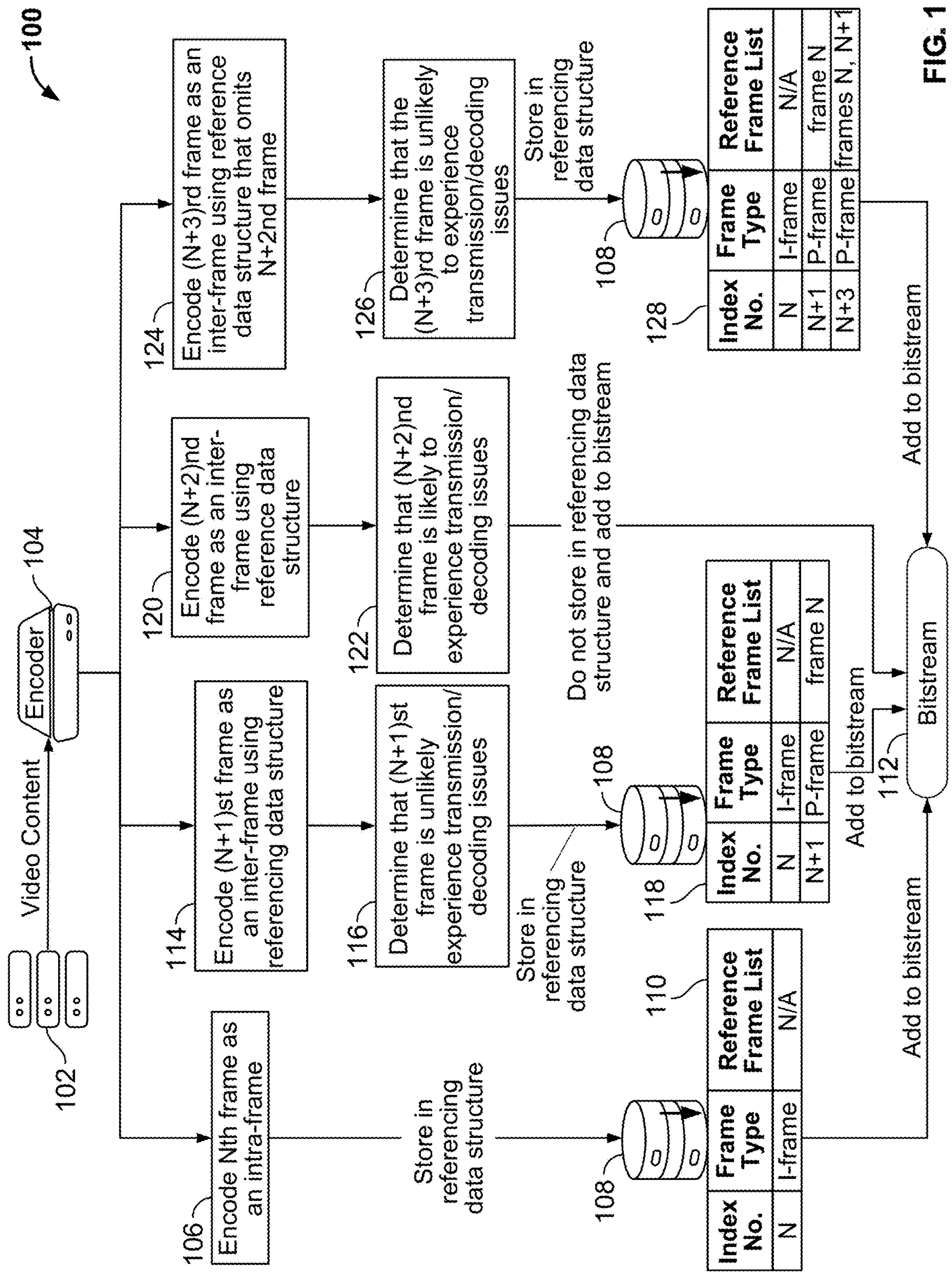
FIG. 1 depicts a flowchart of illustrative steps involved in preventively encoding frames based on an optimized inter-prediction referencing data structure, in accordance with some embodiments of the disclosure.

FIG. 1 depicts illustrative steps for transmitting raw video content from video source 102 (e.g., video 440 of FIG. 4) to encoder 104 to perform preventive encoding process 100. In some embodiments, encoder 104 is a software encoder, e.g., running on control circuitry 634. In some instances, encoder 104 is a hardware encoder, e.g., corresponding to video encoder 445 of FIG. 4 and/or video encoder 565 of FIG. 5. In some embodiments, the video source is a cloud gaming server, a gaming device being operated via a remote device, a sports broadcaster, a video conferencing platform, a live streaming service, a surveillance system, a telemedicine service, an XR device, an online gambling server, a remotely operated drone, or any other suitable media source that streams its content under low-latency conditions in order to provide an adequate product. In some embodiments, due to the low-latency requirements of each of the mentioned media sources, encoder 104 is configured to perform a single-pass encoding of the video frames to prioritize a high encoding efficiency. When configured for single-pass encoding, encoder 104 is unable to analyze future frames to properly optimize bitrate allocation, making it harder to match the encoded frame sizes to a target stream bitrate. Transmitting packets above the target bitrate increases the potential for the frames corresponding to the particular packets to be dropped due to, e.g., packet loss/delay during transmission, or reassembly errors/delays during decoding. Since maintaining low-latency video delivery is a primary priority for the streaming scenarios mentioned above, it is important to mitigate potential video display issues (e.g., playback stall, poorly reconstructed pictures, continuous broken pictures, etc.) caused by transmission or decoding issues without relying on current solutions like packet retransmission, which significantly increases latency in the end-to-end process, or reference frame invalidation, which demands a consistently high bitrate stream due to the need for frequent key-frames.

Preventive encoding process 100 initiates a solution at the encoder by preventively encoding frames to avoid referencing those with a high likelihood of transmission and decoding issues. In some embodiments, transmission issues include packet loss, packet delay, packet jitter, packet corruption, or any other suitable transmission issues. Each of these transmission issues has a direct negative affect on the decoder's ability to correctly reconstruct the frame corresponding to the lost/delayed/corrupted packets leading to possible decoder errors. In some embodiments, decoding issues include frame drop, frame freezing, decoding lag, or any other suitable decoding issues. The description of preventive encoding process 100 demonstrates how preventively encoding frames minimizes the negative effects of potential transmission and decoding issues, therefore helping to maintain a low-latency stream. At step 106 of preventive encoding process 100, encoder 104 encodes the Nth frame of a video as an intra-frame ("I-frame"). In some embodiments, the Nth frame is encoded as an I-frame because the frame is the beginning of a GOP, the frame corresponds to a scene change, the frame occurs at specific interval for random access (e.g., for fast-forwarding or seeking), or based on any other suitable encoding decision. The encoded Nth frame, regardless of file size, is stored in referencing data structure 108 (e.g., located at storage circuitry 638 of FIG. 6) since, as an I-frame, it acts as a key frame/anchor for subsequent inter-frames. As shown in the reference frame list of data table 110, it does not reference any other frames (i.e., it contains the full image data corresponding to that frame). The encoded Nth frame is then added to bitstream 112 as one or more packets that are transmitted to a decoder (e.g., video decoder 480 of FIG. 4 and/or video decoder 520 of FIG. 5). The encoded frames can be stored in the referencing data structure and added to the bitstream in parallel, or these steps can be performed sequentially in any suitable order.

At step 114, the encoder uses the referencing data structure to encode the (N+1)st frame as an inter-frame referencing to the Nth frame. In some embodiments, a frame is encoded as an inter-frame based on estimating movement differences between the current frame and previous frame, scene continuity with the previous frame, a predetermined sequence of GOP, or any other suitable encoding decision. Notably, inter-frames store only the motion compensated difference between the current frame and previous frame. This makes them favorable encoding options for the low-latency streaming scenarios due to providing more efficient compression and quicker encoding time, two factors that help lower the latency and meet the target bitrate of the stream.

At step 116, the encoder determines that the (N+1)st frame is unlikely to experience transmission and/or decoding issues during the end-to-end video delivery process, e.g., because the frame is encoded and compressed below a threshold frame size. The various embodiments of determining the probability of a transmission and decoding issue are discussed further in the description of FIG. 8. Based on determining that the (N+1)st frame is unlikely to experience transmission and/or decoding issues, the encoder stores the (N+1)st frame in referencing data structure 108 so that it can be used as a reference frame for subsequent frames. As shown in data table 118 the (N+1)st frame references frame N and does not reference any subsequent frames, therefore making it a P-frame. The encoder then adds the (N+1)st frame to bitstream 112 for transmission. As previously mentioned, the storing of the decoded frames to the referencing data structure and the adding to the bitstream can be done in parallel or sequentially in any order.

In some embodiments, a frame is omitted from referencing data structure 108, even if it has a low probability of experiencing transmission and/or decoding issues. In some approaches, encoder 104 omits a frame from referencing data structure 108 because of memory constraints, because the frame is a low-priority frame (i.e., frames that contain little differences in image information compared to the previous frame(s)), because the frame precedes a scene change, or because of any other suitable decision to omit a frame from referencing data structure 108.

At step 120, the encoder uses the referencing data structure to encode the (N+2)nd frame as an inter-frame referencing the Nth frame and/or the (N+1)st frame. In some embodiments, the encoder selects the reference frames that provide the highest compression efficiency and reduce the necessary bitrate for the encoded frame. In some embodiments, a particular frame references only one frame.

At step 122, the encoder determines that the (N+2)nd frame is likely to experience transmission and/or decoding issues, e.g., the frame is encoded and compressed above a threshold frame size. As previously mentioned, the various embodiments of determining the probability of transmission and decoding issues are discussed further in the description of FIG. 8. Since the (N+2)nd frame is likely to experience transmission and/or decoding issues, the encoder does not store the frame in the referencing data structure and adds it only to bitstream 112.

If the (N+2)nd frame was stored in the referencing data structure and used as a reference frame for subsequent frames, it would greatly increase the risk of the potential transmission and/or decoding issues causing cascading errors for subsequent portions of the video stream. For example, say the two subsequent frames in the video referenced the (N+2)nd frame. If the packets of the (N+2)nd frame are lost or delayed during transmission, the two subsequent frames would lack vital referential image data needed to properly decode the frames. Without all necessary reference data, the decoded frames would be corrupted with visual artifacts, pixelation, or might even be blank frames. Any frames that reference the corrupted frames would also experience decoding issues due to lack of reference data therefore leading to a propagation of errors though the subsequent sequence of frames (e.g., as shown in video frame decoding process 210 of FIG. 2B). In some embodiments, the error propagation causes the video playback to freeze completely until the next I-frame is decoded. As previously mentioned, it is often best to minimize the frequency of I-frames in a low-latency stream in order to allow for a lower, less spiky target bitrate. Transmission and/or decoding issues therefore have a potential of causing extended undesired pauses in video playback, making the video stream ineffective for the purposes of cloud gaming, XR interaction, or any other low-latency scenarios. Since a low-latency stream cannot generally afford the time to retransmit packets corresponding to lost/dropped/delayed frames, removing the (N+2)nd frame from the referencing list provides a preventive solution for addressing the effects of frame loss in the transmission and decoding process.

At step 124, the encoder uses the referencing data structure to encode the (N+3)rd frame as an inter-frame referencing the Nth frame and/or the (N+1)st frame. As noted above, the (N+2)nd frame is purposefully omitted from the referencing data structure since it may likely experience transmission and/or decoding issues at some point during the end-to-end video delivery process. Since the (N+3)rd frame does not reference the (N+2)nd frame, the encoder has removed any possibility of the potential transmission and/or decoding issues of the (N+2)nd frame affecting the (N+3)rd frame. Thus, even if transmission and/or decoding issues occur, only the dropped, lost, or delayed frame is affected, while subsequent frames are decoded and displayed without any error propagation (e.g., as shown in video frame decoding process 310 of FIG. 3B). In some embodiments, no transmission or decoding issues occur and the (N+3)rd frame is normally decoded and displayed. Note that unlike solutions such as packet retransmission or reference frame invalidation, preventive encoding process 100 is contained to and fully executed at the encoder. Once the encoder transmits the packets corresponding to the encoded frames, the stream is fully configured to prevent error propagation, requiring no special tasks or feedback from the decoder or video player that could increase the latency of the end-to-end video delivery process. Allowing the decoder and video player to follow an efficient decoding and video playback process, therefore, helps maintain the low-latency of the videos stream.

At step 126, the encoder determines that the (N+3)rd frame is unlikely to experience transmission and/or decoding issues during the end-to-end video delivery process, e.g., the frame is encoded and compressed below a threshold frame size. As previously mentioned, the various embodiments of determining the probability of transmission and decoding issues are discussed further in the description of FIG. 8. Based on determining that the (N+3)rd frame is unlikely to experience transmission and/or decoding issues, the encoder stores the (N+3)rd frame in referencing data structure 108 so that it can be used as a reference frame for subsequent frames. As mentioned above, in some embodiments, frames that are unlikely to experience transmission and/or decoding issues are not added to the referencing data structure 108 (e.g., based on memory constraints, the frame being a low-priority frame, the frame preceding a scene change, etc.). Data table 128 references frames N and N+1 and does not reference any subsequent frames, therefore making it a P-frame. The encoder then adds the (N+3)rd frame to bitstream 112 for transmission.

Figure 2A:
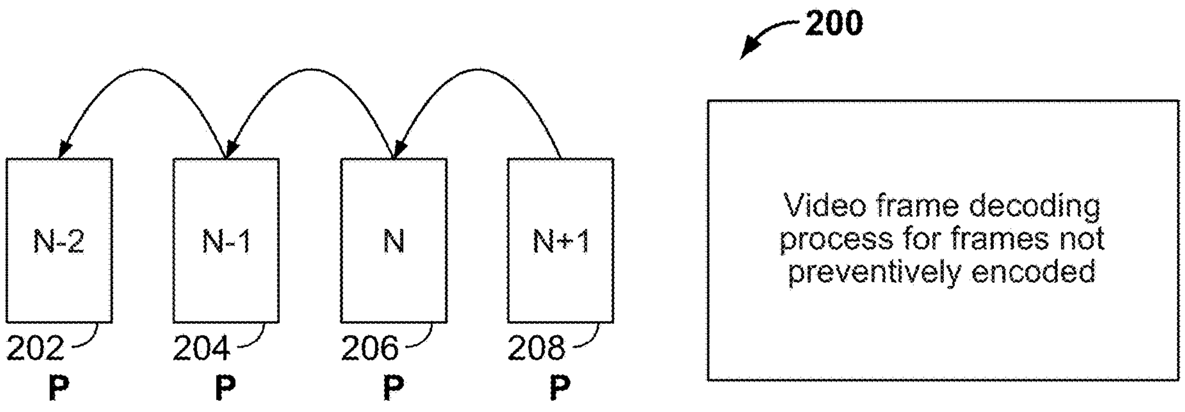
FIG. 2A depicts a block diagram representing a video frame decoding process for frames that were not preventively encoded, in accordance with some embodiments of the disclosure.

FIG. 2A depicts video frame decoding process 200, providing an example of decoding P-frames when the frames were not encoded using a preventive encoding process (e.g., preventive encoding process 100 of FIG. 1). As shown by the arrows between (N−2)nd frame 202, (N−1)st frame 204, Nth frame 206, and (N+1)st frame 208, each frame references the frame directly preceding it. Video frame decoding process 200 demonstrates that when no frame loss occurs during decoding (i.e., decoder does not drop any frames and all frame data arrives at decoder on time), P-frames are decoded and presented in a straightforward and efficient manner.

Figure 2B:
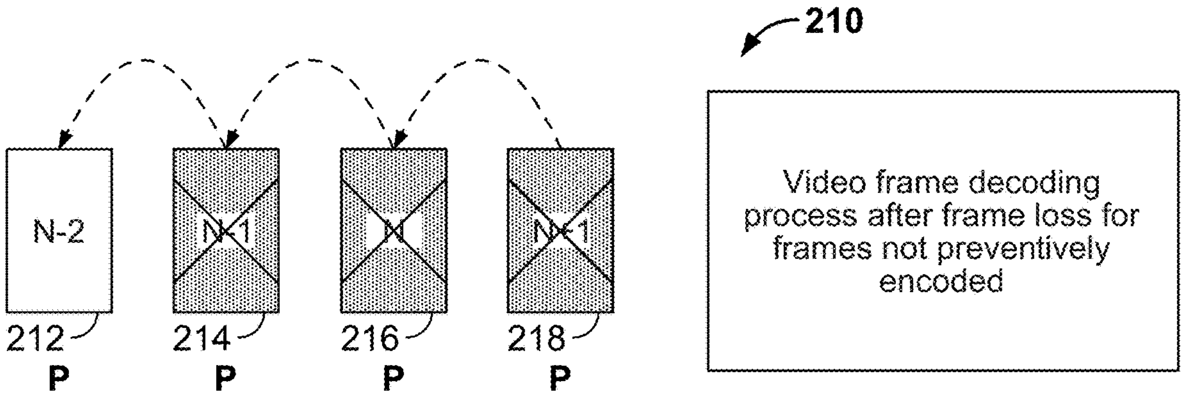
FIG. 2B depicts a block diagram representing a frame loss scenario during a video frame decoding process for frames not preventively encoded, in accordance with some embodiments of the disclosure.

FIG. 2B depicts video frame decoding process 210, which provides an example of what occurs to the decoding of P-frames after a frame loss during decoding (e.g., decoder drops a frame or frame data does not arrive in time or at all) if the frames were not encoded using a preventive encoding process (e.g., preventive encoding process 100 of FIG. 1). As shown by the arrows between (N−2)nd frame 212, (N−1)st frame 214, Nth frame 216, and (N+1)st frame 218, each frame references the frame directly preceding it, similarly to the frames from video frame decoding process 200. Unlike video frame decoding process 200, video frame decoding process 210 experiences a loss of (N−1)st frame 214. Since each frame is encoded to reference the directly preceding frame, Nth frame 216, which references the lost (N−1)st frame 214, lacks the necessary reference data to be properly decoded. Without the necessary reference data, the decoder is unable to ensure proper decoding, leading to image corruption or even the complete inability to decode the frame. The decoding issues of Nth frame 216 are then passed on to (N+1)st frame 218, which passes its own decoding issues to the next P-frame, thereby causing a propagation of decoding issues. The decoder will eventually recover when all packets for the next I-frame are transmitted and decoded; however, in some embodiments, low-latency streams will contain a limited frequency of I-frames to maintain compression efficiency and a low stream bitrate. Therefore, in such embodiments, error propagation in a low-latency stream can lead to an extended sequence of corrupted frames, or even complete freezing of the video before the packets for the next I-frame are transmitted and decoded.

Figure 2C:
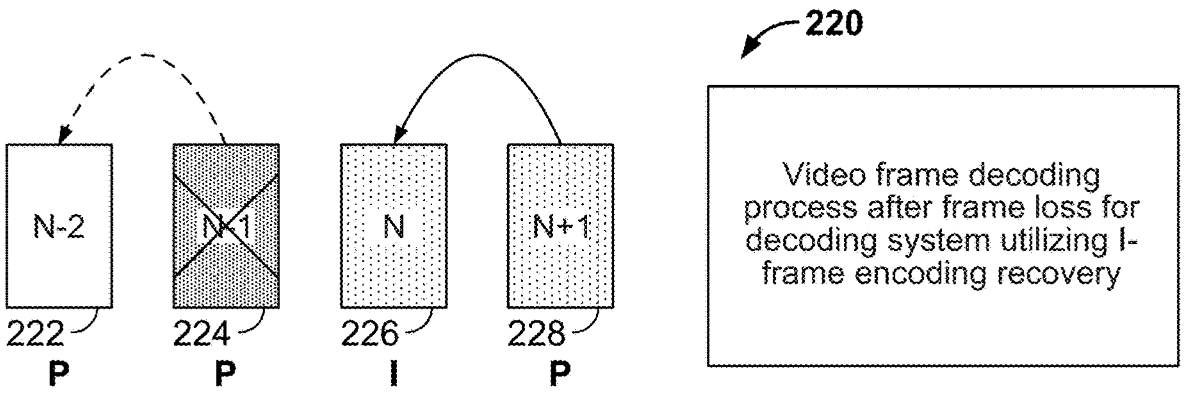
FIG. 2C depicts a block diagram representing a frame loss scenario during a video frame decoding process that utilizes I-frame encoding recovery, in accordance with some embodiments of the disclosure.

FIG. 2C depicts video frame decoding process 220, which provides an example of what occurs to the decoding of P-frames after a frame loss if the encoding system utilizes I-frame encoding recovery. Video frame decoding process 220 experiences a loss of (N−1)st frame 224, resembling the frame loss in video frame decoding process 210. Rather than letting the lost frame cause an error propagation, video frame decoding process 220 demonstrates that, in some embodiments, the decoder will notify the encoder of the lost frame and request that the subsequent frame be encoded as an I-frame. For example, in video frame decoding process 220, in response to determining that (N−1)st frame 224 is lost, Nth frame 226 is re-encoded as an I-frame and the packets of the new I-frame are transmitted to the decoder. Since Nth frame 226 is an I-frame, it does not reference any other frames (as represented by Nth frame 226 having no arrow directed to a preceding frame) and is, therefore, immune to any decoding issues that the lost (N−1)st frame 224 could have caused. As a result, Nth frame 226 becomes a suitable reference frame for (N+1)st frame 228 and any subsequent frames (as shown by the arrow from (N+1)st frame 228 directed to Nth frame 226). By assuming a recovery at the frame immediately following the lost frame, video frame decoding process 220 is able to recover without a substantial loss and/or corruption of subsequent frames. In some embodiments, the newly encoded I-frame is an instantaneous decoder refresh (IDR) frame, which indicates to the decoder that no frame after the IDR frame references any frame before it.

The potential downside to encoding the subsequent frame as an I-frame is that I-frames typically result in more data than P-frames, and therefore require more packets to be transmitted to the decoder. Transmitting more packets per frame can lead to longer transmission and decoding times, both of which contribute to increased stream latency. In the worst-case scenario, packets are lost, dropped, or delayed during transmission. Without all necessary frame data, the I-frame is decoded with visual artifacts or, in some embodiments, not decoded at all, thereby making the frame an unsuitable reference frame. In some approaches, the encoder reduces the I-frame size (e.g., by increasing the quantization, reducing the image resolution, etc.); however, such approaches will lead to an inferior picture quality.

To avoid potential downsides mentioned above (i.e., packet loss/delay, inferior picture quality, and increased latency), the system can use techniques described in application Ser. No. 17/992,582, "Video Compression at Scene Changes for Low-latency Interactive Experience," (hereinafter "the '582 application") which is hereby incorporated by reference herein in its entirety. The techniques of the '582 application disclose a recovery process that can be performed across multiple frames. Then, the encoder utilizes Advanced Video Coding (AVC) slicing (corresponding to video compression standard H.264) and High Efficiency Video Coding (HEVC) tiling (corresponding to video compression standard H.265) to distribute the slices or tiles for the newly generated I-frame over the next several frames. Since each I-frame slice/tile is spread out along different frames, the I-frame data can be transmitted while minimizing the risk of potentially exceeding the available network bandwidth.

To enable efficient communication between the encoder and decoder, the system can use techniques described in App. No. Ser. No. 18/622,467, "Optimized Fast Video Frame Repair for Extreme Low-latency RTP Delivery," (hereinafter "the '467 application") which is hereby incorporated by reference herein in its entirety. In embodiments utilizing the techniques of the '467 application, the collaboration between the encoder and decoder for I-frame recovery is streamlined by leveraging low-latency feedback from the decoder to the encoder using real-time streaming protocols, e.g., Real-Time Transport Protocol (RTP).

Figure 3A:
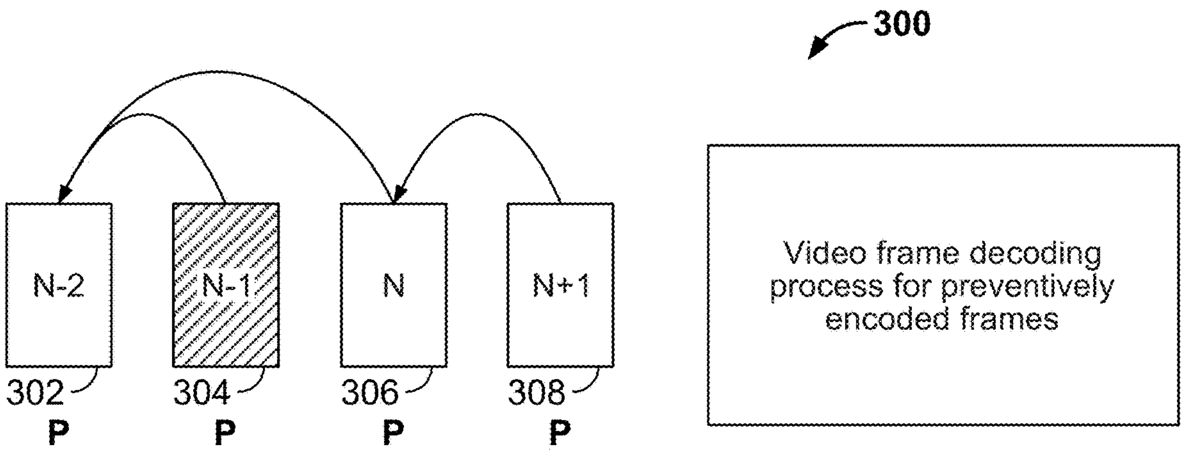
FIG. 3A depicts a block diagram representing a video frame decoding process for frames that were preventively encoded, in accordance with some embodiments of the disclosure.

FIG. 3A shows video frame decoding process 300, which represents a scenario in which a sequence of frames that include a preventively encoded frame (e.g., through preventive encoding process 100 of FIG. 1) do not experience a frame loss during decoding. When the encoder encodes a frame, it also includes metadata or syntax that indicates which frame(s) the encoded frame references. FIG. 3A demonstrates how the metadata or syntax is used to decode a sequence of frames, including a frame identified as being at risk of transmission and/or decoding issues leading to possible frame loss. For example, for the sequence of frames shown in video frame decoding process 300, (N−1)st frame 304 has been determined to have a potential of getting lost during the end-to-end encoding process (i.e., the various embodiments of determining a frame's potential of getting lost are discussed further in the description of FIG. 8.). Based on being identified as an at-risk frame, the encoder omitted (N−1)st frame 304 from the optimized referencing data structure. Since (N−1)st frame 304 was not used as a reference for any frame, it naturally causes (N−1)st frame 304 to not be included in any of the reference data sent to the decoder. Therefore, as shown by the arrows between (N−2)nd frame 302, (N−1)st frame 304, Nth frame 306, and (N+1)st frame 308, there is no frame that references (N−1)st frame 304. Note that (N−1)st frame 304 is not actually lost in video frame decoding process 300; however, the referencing order and encoding of the frames was already set by the encoder. Once the referencing metadata and the encoded frames are transmitted, the metadata and encoded frames are not modified by the decoder. The decoder therefore does not need to be involved in providing special feedback and can merely decode each frame as the transmitted reference metadata instructs. This demonstrates that preventively encoding frames does not affect the latency of the stream or the operating procedure of the decoder. Rather, it merely modifies the decoding instructions sent to the decoder.

Figure 3B:
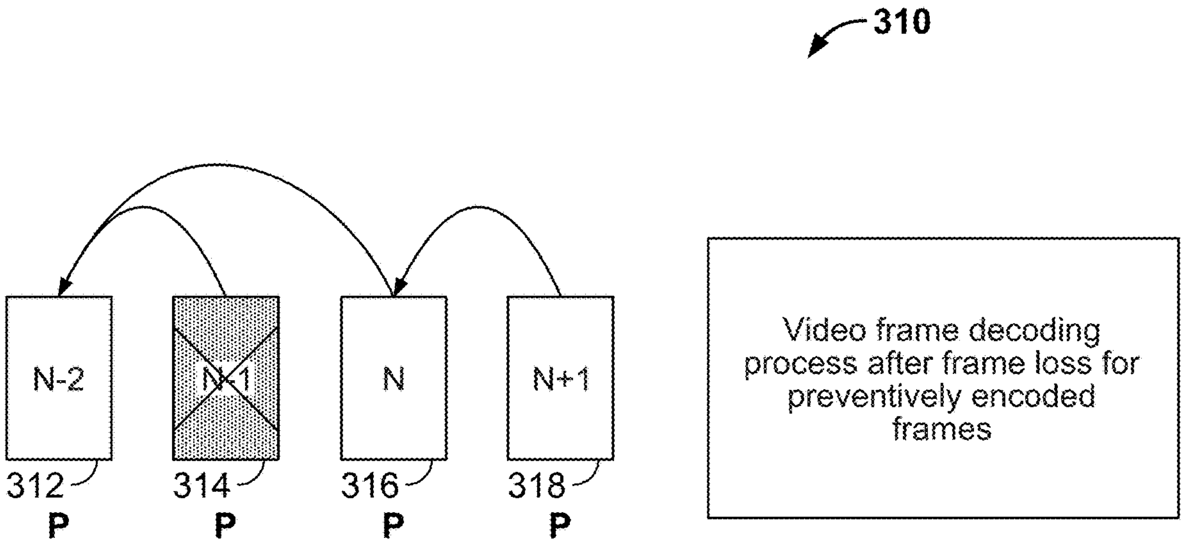
FIG. 3B depicts a block diagram representing a frame loss scenario during a video frame decoding process for frames that were preventively encoded, in accordance with some embodiments of the disclosure.

FIG. 3B shows video frame decoding process 310, which represents a scenario in which a sequence of frames that were encoded using a preventive encoding process (e.g., preventive encoding process 100 of FIG. 1), experience a frame loss during decoding. As indicated above, a decoder reconstructs frames based on referencing metadata encoded with the particular frames.

As indicated by the arrows between (N−2)nd frame 312, (N−1)st frame 314, Nth frame 316, and (N+1)st frame 318, no frame references (N−1)st frame 314 because the encoder determined it was at risk of experiencing transmission and/or decoding issues and could therefore be lost during or prior to decoding. Consequently, (N−1)st frame 314 was omitted from the optimized referencing data structure, preventing its inclusion in the reference metadata of any subsequent frames. As shown by the "X" overlayed over (N−1)st frame 304, the frame was lost during the video frame decoding process 310 (e.g., either during decoding or transmission). However, unlike in the frame loss scenario of video frame decoding process 210, the loss of (N−1)st frame 314 does not cause an error propagation of subsequent frames (e.g., Nth frame 316, and (N+1)st frame 318). Since the encoder preventively encoded the subsequent frames to not reference (N−1)st frame 314, the decoder is able to continue decoding all frames after the lost frame without experiencing any decoding issues (e.g., visual artifacts, pixelation, blank frames, etc.).

In some embodiments, the encoder will predict that the data for the preventively encoded frame will also be transmitted above a target bitrate, e.g., since it uses the same reference frame as the frame at risk of facing transmission and/or decoding issues. For example, in FIG. 3B, the at-risk frame, (N−1)st frame 314, and the preventively encoded frame, Nth frame 316, both reference (N−2)nd frame 312. Therefore, in some embodiments, unless the Nth frame is drastically more similar to the (N−2)nd frame than the (N−1)st frame is, the Nth frame will also be encoded to contain a large amount of data. In such embodiments, the encoder may therefore reduce the target bits per frame for subsequent frames based on encoding statistics of the at-risk frame to minimize the chance of transmission issues persisting. In some approaches, the encoder will achieve a reduced target bits per frame by applying more aggressive compression techniques (e.g., applying more aggressive quantization). In some embodiments, an encoder iteratively performs the preventive encoding process, i.e., (N+1)st frame 308 and a (N+2)nd frame are also preventively encoded. In such embodiments, if the encoder has to iteratively encode a threshold number of frames in a row, it will employ the I-frame encoding recovery technique of FIG. 2C and re-encode one of the frames as an I-frame.

In some approaches, the encoder can leverage the low-latency feedback techniques disclosed by the '467 application for the encoder to efficiently receive feedback from the decoder indicating whether a frame experienced transmission and/or decoding issues. The encoder can then use that feedback to determine its choice of reference frames for subsequent frames. Therefore, when a decoder indicates that a frame experienced transmission and/or decoding issues, the encoder can use that information to predictively encode subsequent frames to avoid referencing that particular frame.

In some embodiments, the preventive encoding solution is applied to slices and/or tiles. In such embodiments, the choice of reference can be optimized per slice or tile by encoding a frame with referencing to a partially available or decoded frame.

In some embodiments, when encoding a predictive frame, the referencing metadata for a particular frame can include multiple decoded frames preceding the current frame in the encoding order. For example, Nth frame 316, may also reference frames the (N−3)rd frame, in addition to (N−2)nd frame 312, assuming the (N−3)rd frame was not predicted to experience transmission and/or decoding issues.

In some embodiments, the encoder is configured to perform a multi-pass encoding process. In some embodiments, the preventive encoding solution can also apply to B-frames. In such embodiments, if a particular reference frame for a frame is determined to have a high probability of being lost, the B-frame is encoded using an optimized referencing data structure that omits the particular reference frame.

In some embodiments, the encoder determines that (N−1)st frame 314 depict a scene change, high motion, complex textures, or any other factor that greatly increases the bits per frame. In such embodiments, the encoder will determine if Nth frame 316 will also be encoded as a large frame due to one or more of the mentioned factors if it references any of the other preceding frames. If the encoder determines that the Nth frame 316 will be encoded to contain a large amount of data regardless of which preceding frames it references, it may decide to encode the frame as an I-frame (e.g., as demonstrated in the description of FIG. 2C).

Figure 4:
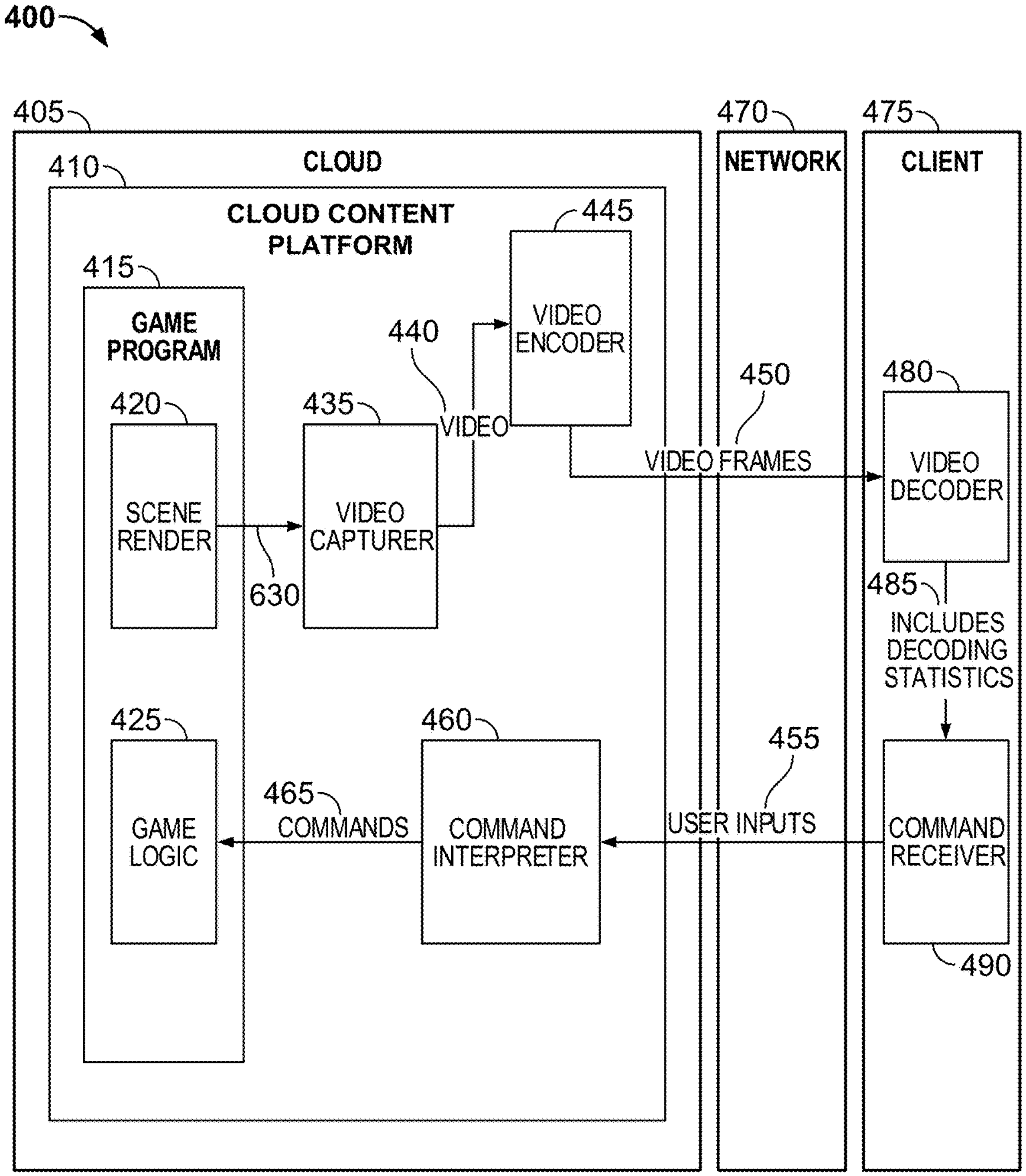
FIG. 4 depicts interactive signaling between an encoder of a cloud content platform and a decoder of a client, in accordance with some embodiments of the disclosure.

FIG. 4. illustrates interactive signaling between decoder and encoder, i.e., collaborative encoding and decoding. A system 400 includes a cloud 405, which is operatively connected to a network 470, which is operatively connected to a client 475. The cloud 405 includes a cloud content platform 410. The cloud content platform 410 includes a game program module 415, which communicates with a video capture module 435, which communicates with a video encoder 445. The cloud content platform 410 includes a command interpreter module 460, which communicates with the game program module 415. The game program module 415 includes a scene reader module 420, which communicates with a game logic module 425.

In an example mode of operation, the scene reader module 420 of the game program module 415 is configured to transmit 430 a rendered scene to the video capture module 435, which is configured to transmit video 440 to the video encoder 445, which is configured to transmit video frames 450 across the network 470 to the client 475, which is configured to receive the video frames 450 with a video decoder 480, which communicates with a command receiver module 490 of the client 475. The video decoder 480 is configured to transmit 485 decoding statistics to the command receiver module 490, which is configured to transmit 455 user inputs across the network 470 to the command interpreter module 460 of the cloud content platform 410. The command interpreter module 460 is configured to transmit 465 commands to the game logic module 425 of the game program module 415, which is configured to communicate with the scene reader module 420 of the game program module 415.

In some embodiments, decoding may start from receipt of a packet containing a partial frame, e.g. at least one slice, at least one tile, a few macroblocks, or macroblock rows to start with. In response to determination of an unpredictable and fluctuating network condition, the decoder at the client is configured to automatically decode the macroblocks received in time and skip the rest (assuming the rest of the macroblocks are encoded in skipped mode). The decoder then signals the position of macroblocks that are to be updated, and downstream processes respond accordingly. In some embodiments, the encoding may include preventively encoding frames to not reference frames that have a high probability of experiencing transmission and/or encoding issues.

With such interactive signaling and preventive encoding, the gameplay is made continuous and smooth. For interactive signaling, the pictures are updated over time and picture quality improves without obvious artifacts due to missing macroblocks. For preventive encoding, frames can be properly decoded even if a frame that was predicted to be lost does not get decoded, therefore also preventing potential artifacts in the stream. That is, interactive signaling and preventive encoding avoid problems occurring with conventional approaches, which allow artifacts due to missing macroblocks and/or frames to propagate and persist by conventional inter-prediction and compensation processes.

Figure 5:
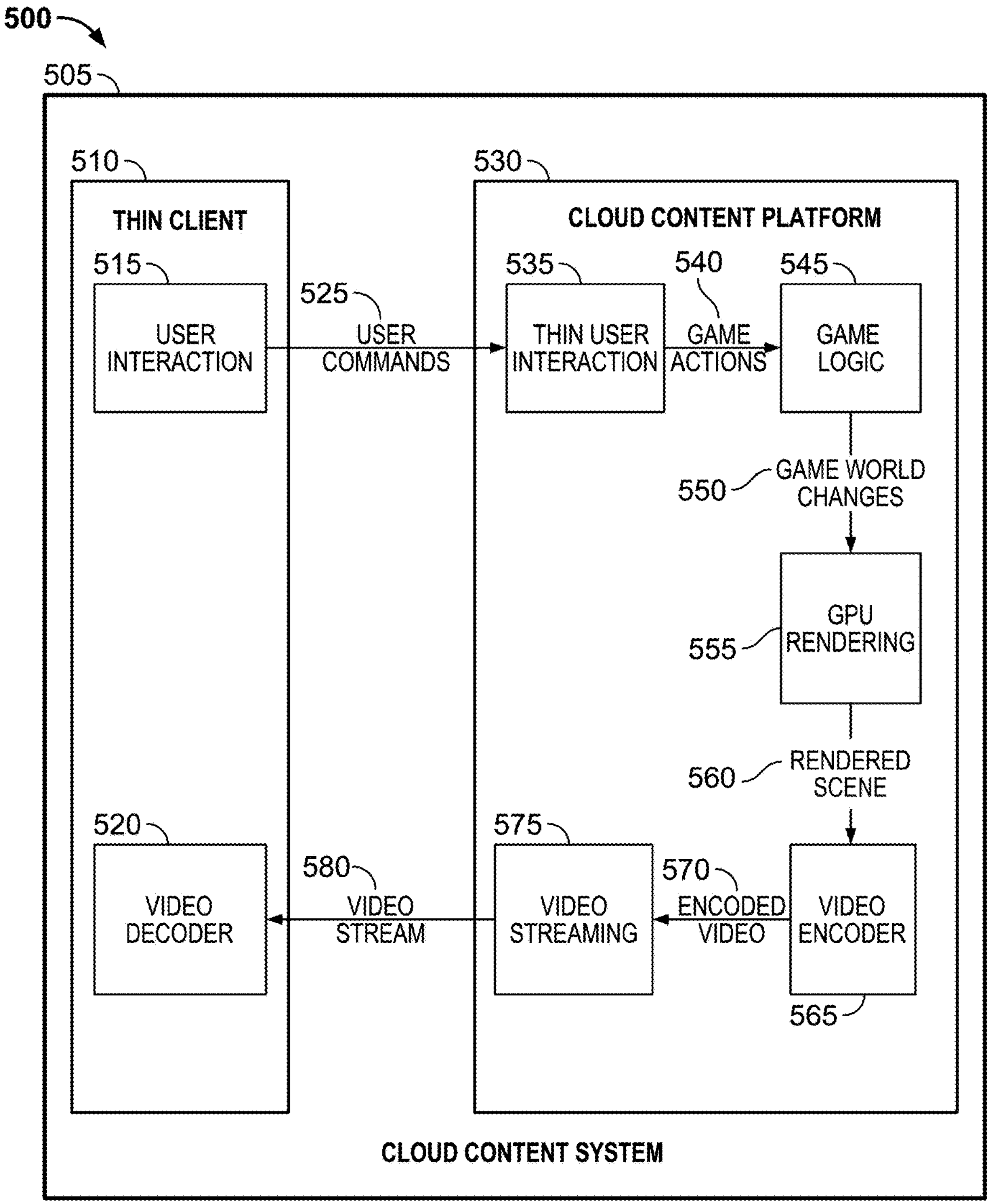
FIG. 5 depicts a cloud gaming framework, in accordance with some embodiments of the disclosure.

FIG. 5 illustrates a framework system 500 of a cloud gaming system 505. The cloud gaming system 505 includes a thin client 510 operatively connected to a cloud content platform 530. The thin client 510 collects user interactions (e.g., instructions and requests) from a user device 515 and sends user commands 525 (e.g., the instructions and requests) to the cloud content platform 530 for rendering in response to the user commands inputted into the user device 515. Specifically, the cloud content platform 530 includes at least one of a thin client interaction module 535, a game logic module 545, a graphics processing unit (GPU) rendering module 555, a video encoder 565, or a video streaming module 575. The thin client interaction module 535 of the cloud content platform 530 receives user commands 525 from the thin client 510. The thin client interaction module 535 sends 540 game actions to the game logic module 545, which sends 550 game world changes to the graphics processing unit (GPU) rendering module 555, which sends 560 a rendered scene to the video encoder 565, which sends 570 encoded stream to the video streaming module 575, which sends 580 a video stream to a video decoder 520 of the thin client 510.

Systems 400 and 500 are exemplary and not intended to be limiting. Any suitable combination of modules may be provided to perform one or more of the functions disclosed herein without limitation.

Figure 6:
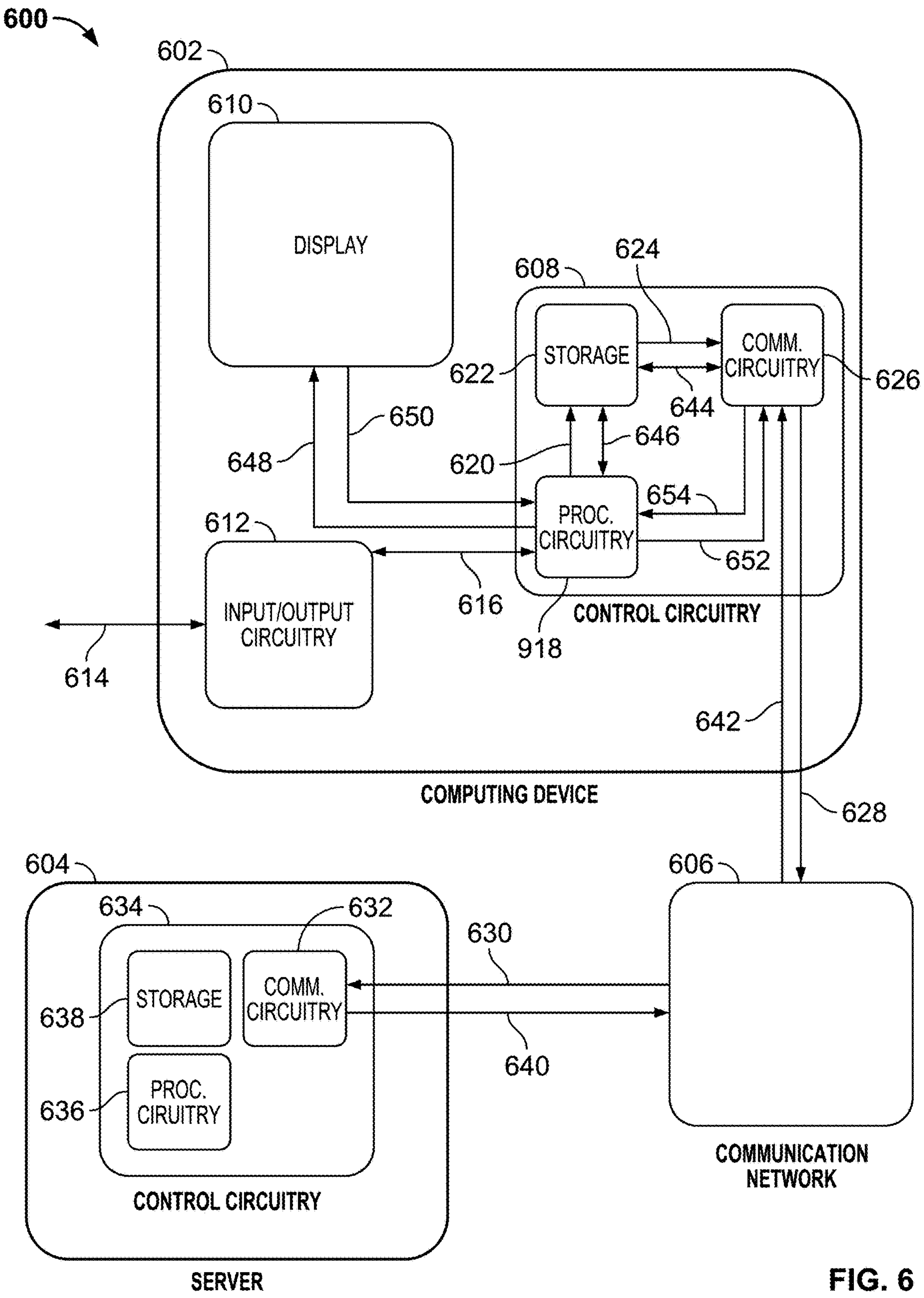
FIG. 6 depicts a system including a server, a communication network, and a computing device for performing the methods and processes, in accordance with some embodiments of the disclosure.

FIG. 6 depicts a block diagram of system 900, in accordance with some embodiments. The system is shown to include computing device 602, server 604, and a communication network 606. It is understood that while a single instance of a component may be shown and described relative to FIG. 6, additional instances of the component may be employed. For example, server 604 may include, or may be incorporated in, more than one server. Similarly, communication network 606 may include, or may be incorporated in, more than one communication network. Server 604 is shown communicatively coupled to computing device 602 through communication network 606. While not shown in FIG. 6, server 604 may be directly communicatively coupled to computing device 602, for example, in a system absent or bypassing communication network 606.

Communication network 606 may include one or more network systems, such as, without limitation, the Internet, LAN, Wi-Fi, wireless, or other network systems suitable for audio processing applications. The system 900 of FIG. 6 excludes server 604, and functionality that would otherwise be implemented by server 604 is instead implemented by other components of the system depicted by FIG. 6, such as one or more components of communication network 606. In still other embodiments, server 604 works in conjunction with one or more components of communication network 606 to implement certain functionality described herein in a distributed or cooperative manner. Similarly, the system depicted by FIG. 6 excludes computing device 602, and functionality that would otherwise be implemented by computing device 602 is instead implemented by other components of the system depicted by FIG. 6, such as one or more components of communication network 606 or server 604 or a combination of the same. In other embodiments, computing device 602 works in conjunction with one or more components of communication network 606 or server 604 to implement certain functionality described herein in a distributed or cooperative manner.

Computing device 602 includes control circuitry 608, display 610 and input/output (I/O) circuitry 612. Control circuitry 608 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), or application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 608 in turn includes communication circuitry 626, storage 622 and processing circuitry 618. Either of control circuitry 608 and 634 may be utilized to execute or perform any or all the methods, processes, and outputs of one or more of FIGS. 1A-8, or any combination of steps thereof (e.g., as enabled by processing circuitries 618 and 636, respectively). For example, in some embodiments, control circuitry 608 and control circuitry 634 are configured to run encoder 104 of FIG. 1 and/or encoder 704 of FIG. 7.

In addition to control circuitry 608 and 634, computing device 602 and server 604 may each include storage (storage 622, and storage 638, respectively). Each of storages 622 and 638 may be an electronic storage device. In some embodiments, storages 622 and 638 are configured to store referencing data structure 108 of FIG. 1 and referencing data structure 713 of FIG. 7. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 622 and 638 may be used to store various types of content, metadata, and/or other types of data. Non-volatile memory may also be used (e.g., to launch a boot-up routine and other instructions). Cloud-based storage may be used to supplement storages 622 and 638 or instead of storages 622 and 638. In some embodiments, a user profile and messages corresponding to a chain of communication may be stored in one or more of storages 622 and 638. Each of storages 622 and 638 may be utilized to store commands, for example, such that when each of processing circuitries 618 and 636, respectively, are prompted through control circuitries 608 and 634, respectively. Either of processing circuitries 618 or 636 may execute any of the methods, processes, and outputs of one or more of FIGS. 1A-8, or any combination of steps thereof.

In some embodiments, control circuitry 608 and/or 634 executes instructions for an application stored in memory (e.g., storage 622 and/or storage 638). Specifically, control circuitry 608 and/or 634 may be instructed by the application to perform the functions discussed herein. In some embodiments, any action performed by control circuitry 608 and/or 634 may be based on instructions received from the application. For example, the application may be implemented as software or a set of and/or one or more executable instructions that may be stored in storage 622 and/or 638 and executed by control circuitry 608 and/or 634. The application may be a client/server application where only a client application resides on computing device 602, and a server application resides on server 604.

The application may be implemented using any suitable architecture. For example, it may be a stand-alone application wholly implemented on computing device 602. In such an approach, instructions for the application are stored locally (e.g., in storage 622), and data for use by the application is downloaded on a periodic basis (e.g., from an out-of-band feed, from an Internet resource, or using another suitable approach). Control circuitry 608 may retrieve instructions for the application from storage 622 and process the instructions to perform the functionality described herein. Based on the processed instructions, control circuitry 608 may determine a type of action to perform in response to input received from I/O circuitry 612 or from communication network 606.

In client/server-based embodiments, control circuitry 608 may include communication circuitry suitable for communicating with an application server (e.g., server 604) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 606). In another example of a client/server-based application, control circuitry 608 runs a web browser that interprets web pages provided by a remote server (e.g., server 604). For example, the remote server may store the instructions for the application in a storage device.

The remote server may process the stored instructions using circuitry (e.g., control circuitry 634) and/or generate displays. Computing device 602 may receive the displays generated by the remote server and may display the content of the displays locally via display 610. For example, display 610 may be utilized to present a string of characters. This way, the processing of the instructions is performed remotely (e.g., by server 604) while the resulting displays, such as the display windows described elsewhere herein, are provided locally on computing device 602. Computing device 602 may receive inputs from the user via input/output circuitry 612 and transmit those inputs to the remote server for processing and generating the corresponding displays.

Alternatively, computing device 602 may receive inputs from the user via input/output circuitry 612 and process and display the received inputs locally, by control circuitry 608 and display 610, respectively. For example, input/output circuitry 612 may correspond to a keyboard and/or a set of and/or one or more speakers/microphones which are used to receive user inputs (e.g., input as displayed in a search bar or a display of FIG. 6 on a computing device).

Input/output circuitry 612 may also correspond to a communication link between display 610 and control circuitry 608 such that display 610 updates in response to inputs received via input/output circuitry 612 (e.g., simultaneously update what is shown in display 610 based on inputs received by generating corresponding outputs based on instructions stored in memory via a non-transitory, computer-readable medium).

Server 604 and computing device 602 may transmit and receive content and data such as media content via communication network 606. For example, server 604 may be a media content provider, and computing device 602 may be a smart television configured to download or stream media content, such as a live news broadcast, from server 604. Control circuitry 634, 608 may send and receive commands, requests, data packets, and other suitable data through communication network 606 using communication circuitry 632, 626, respectively. Alternatively, control circuitry 634, 608 may communicate directly with each other using communication circuitry 632, 626, respectively, avoiding communication network 606.

It is understood that computing device 602 is not limited to the embodiments and methods shown and described herein. In nonlimiting examples, computing device 602 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 602 receives user input 614 at input/output circuitry 612. For example, computing device 602 may receive a user input such as a user swipe or user touch. It is understood that computing device 602 is not limited to the embodiments and methods shown and described herein.

User input 614 may be received from a user selection-capturing interface that is separate from computing device 602, such as a remote-control device, trackpad, or any other suitable user movement-sensitive, audio-sensitive or capture devices, or as part of computing device 602, such as a touchscreen of display 610. Transmission of user input 614 to computing device 602 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, or any other suitable wireless transmission protocol. Input/output circuitry 612 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 618 may receive user input 614 from input/output circuitry 612 using communication path 616. Processing circuitry 618 may convert or translate the received user input 614 that may be in the form of audio data, visual data, gestures, or movement to digital signals. In some embodiments, input/output circuitry 612 performs the translation to digital signals. In some embodiments, processing circuitry 618 (or processing circuitry 636, as the case may be) carries out disclosed processes and methods.

Processing circuitry 618 may provide requests to storage 622 by communication path 620. Storage 622 may provide requested information to processing circuitry 618 by communication path 646. Storage 622 may transfer a request for information to communication circuitry 626 which may translate or encode the request for information to a format receivable by communication network 606 before transferring the request for information by communication path 628. Communication network 606 may forward the translated or encoded request for information to communication circuitry 632, by communication path 630.

At communication circuitry 632, the translated or encoded request for information, received through communication path 630, is translated or decoded for processing circuitry 636, which will provide a response to the request for information based on information available through control circuitry 634 or storage 638, or a combination thereof. The response to the request for information is then provided back to communication network 606 by communication path 940 in an encoded or translated format such that communication network 606 forwards the encoded or translated response back to communication circuitry 626 by communication path 642.

At communication circuitry 626, the encoded or translated response to the request for information may be provided directly back to processing circuitry 618 by communication path 654 or may be provided to storage 622 through communication path 644, which then provides the information to processing circuitry 618 by communication path 646. Processing circuitry 618 may also provide a request for information directly to communication circuitry 626 through communication path 652, where storage 622 responds to an information request (provided through communication path 620 or 644) by communication path 624 or 646 that storage 622 does not contain information pertaining to the request from processing circuitry 618.

Processing circuitry 618 may process the response to the request received through communication paths 646 or 654 and may provide instructions to display 610 for a notification to be provided to the users through communication path 648. Display 610 may incorporate a timer for providing the notification or may rely on inputs through input/output circuitry 612 from the user, which are forwarded through processing circuitry 618 through communication path 648, to determine how long or in what format to provide the notification. When display 610 determines the display has been completed, a notification may be provided to processing circuitry 618 through communication path 650.

The communication paths provided in FIG. 6 between computing device 602, server 604, communication network 606, and all subcomponents depicted are exemplary and may be modified to reduce processing time or enhance processing capabilities for each step in the processes disclosed herein by one skilled in the art.

Figure 7:
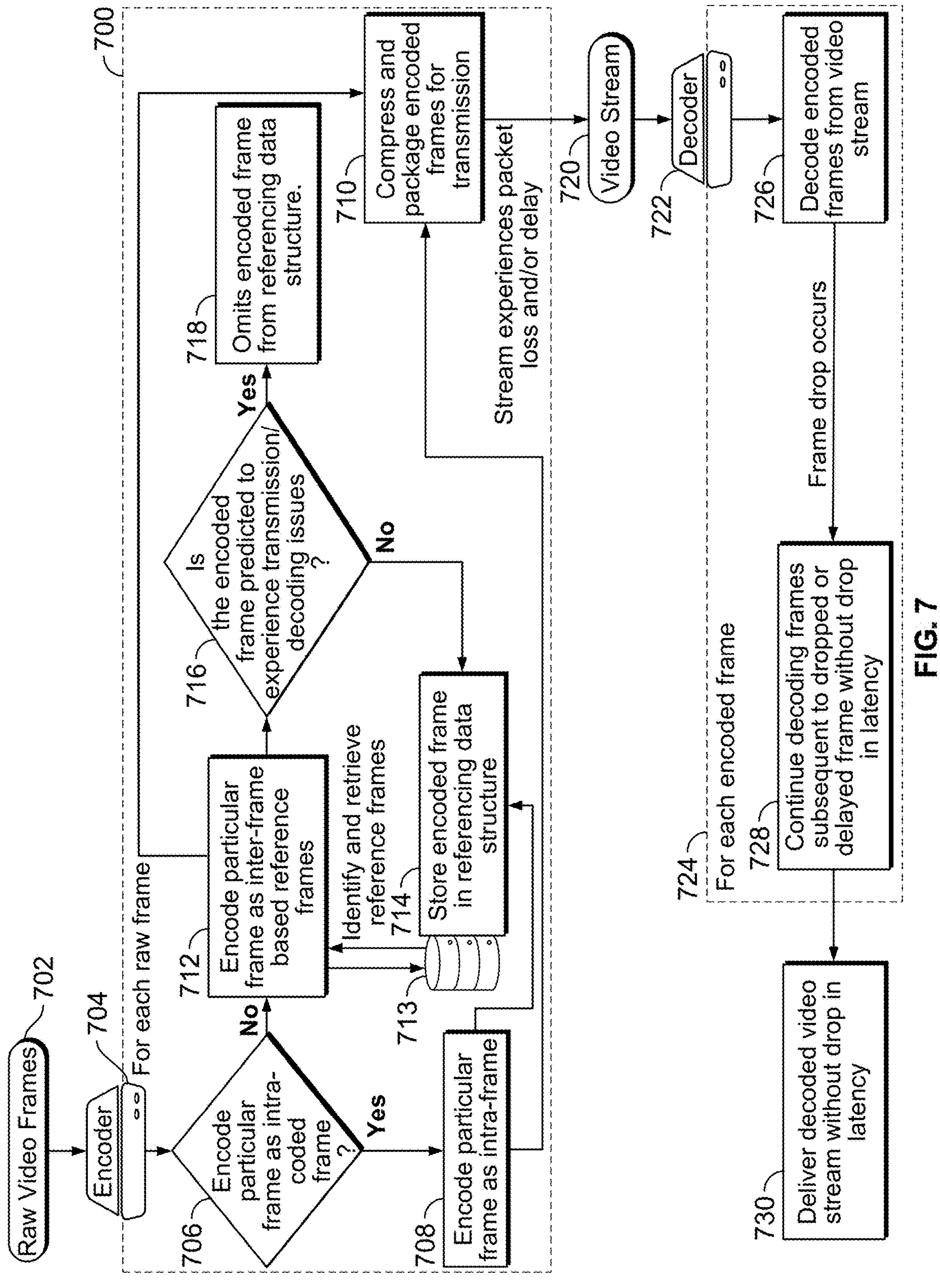
FIG. 7 depicts a flowchart of illustrative steps involved in preventively encoding frames based on an optimized inter-prediction referencing data structure, in accordance with some embodiments of the disclosure.

FIG. 7 depicts a flowchart of illustrative steps involved in implementing preventive video encoding in the end-to-end video delivery process. The process of FIG. 7 begins by transmitting raw video frames 702 (e.g., from video capture module 435 of FIG. 4) to encoder 704 (e.g., corresponding to video encoder 445 of FIG. 4 and/or video encoder 565 of FIG. 5). In some embodiments, encoder 704 runs on control circuitry 634 of server 604 of FIG. 6. In such embodiments, raw video frames 702 are received via communication circuitry 632 of FIG. 6. In some embodiments, encoder 704 runs on control circuitry 608 of FIG. 6. In such embodiments, encoder 704 receives raw video frames 702 via I/O circuitry 612 or communication circuitry 626 of FIG. 6

When encoder 704 receives raw video frames, it begins encoding process 700 for each raw video frame it receives. Initially, at step 706, the encoder (e.g., running on control circuitry 608 or control circuitry 634 of FIG. 6) decides whether to encode a frame as an intra-coded frame (i.e., an I-frame). In some embodiments, the encoder chooses to encode a frame as an I-frame because the frame is the beginning of a GOP, the frame corresponds to a scene change, the frame occurs at specific interval for random access (e.g., for fast-forwarding or seeking), or based on any other suitable encoding decision. If the encoder identifies any of the mentioned conditions, it encodes the frame as an I-frame at step 708. Then, at step 714, the encoder stores the encoded frame in referencing data structure 713 (e.g., located at storage 638 of FIG. 6), and, at step 710, it compresses and packages the encoded frame for transmission. Steps 714 and 710 can be done in parallel or sequentially in any order.

If the encoder determines that the frame should not be encoded as an I-frame, the process moves to step 712 where the encoder encodes the frame as an inter-frame (i.e., a P-frame). In some embodiments, the encoder chooses to encode a frame as a P-frame based on determining differences in motion, texture or lighting between the current frame and the preceding frames (or any other suitable difference in picture characteristics). If the differences in certain picture characteristics are below a threshold level, the encoder decides to encode the frame as a P-frame. At step 712, the encoder identifies and retrieves frames deemed suitable as reference frames for the frame being encoded. In some embodiments, the identified reference frames are those that exhibit the smallest difference in the specified picture characteristics compared to the frame being encoded.

After completing the encoding of the P-frame, the process moves to step 716, where the encoder determines a probability of the particular frame experiencing transmission and/or decoding issues. If the encoder determines that there is a high probability of transmission and/or decoding issues, the encoder omits the particular frame from referencing data structure 713 at step 718. The encoder, therefore, prevents the possibility of a subsequent frame referencing a frame likely to be lost or arriving late, thereby ensuring that the subsequent frame's decoding process is not impacted by the frame loss or late arrival (i.e., the frames are preventively encoded). If the encoder determines that there is a low probability of transmission and/or decoding issues, the encoder adds the particular frame to referencing data structure 713, at step 714 (e.g., executed using control circuitry 608 or control circuitry 634 of FIG. 6). The various embodiments of determining the probability of a frame experiencing transmission and/or decoding issues are discussed further in the description of FIG. 8. Whether a frame is added to the referencing data structure or not, every encoded frame is compressed and packaged for transmission at step 710. In some embodiments the frame drop/delay prediction of step 716 is performed for a particular frame after the compression and packaging process of step 710. In some embodiments, data for a single frame is packaged into multiple individually transmitted packets.

In some approaches, the packets are transmitted via video stream 720 (e.g., corresponding to communication network 606 of FIG. 6), which is directed to decoder 722 (e.g., corresponding to video decoder 480 of FIG. 4, video decoder 520 of FIG. 5, or control circuitry 608 and control circuitry 634 of FIG. 6). Packets, especially those containing data for large frames, may be lost or delayed during transmission due to network issues like congestion, limited bandwidth, or jitter, or any other potential network issues. Furthermore, larger frames require more packets, increasing the likelihood of packet loss as network devices may drop packets to manage traffic and prevent overload. Additionally, packet delays can occur for larger frames if network paths are congested or experiencing high latency, which can result in packets arriving too late for the decoder to process the large frame in time to be displayed.

As soon as enough packets for a frame arrive at decoder 722, the decoder begins decoding process 724 for the particular frame. At step 726 it begins decoding each encoded frame corresponding to packets received from video stream 720. In such embodiments, the frames are decoded sequentially in the order that they were encoded. In such embodiments, the encoder may decode certain frames (e.g., I-frames and some B-frames) in parallel.

As mentioned above, packets for large frames may be lost, dropped, or delayed during the transmission process. In low-latency streaming, decoders often begin decoding as soon as they receive enough packets, but if key packets for a frame are delayed or dropped, the decoder may have trouble correctly decoding the frame without the potential for artifacts or an incomplete picture. The decoder may therefore drop frames corresponding to packets lost, dropped, or delayed during the transmission in order to provide a consistent stream and picture quality. Large frames require more packets, which raises the likelihood of missing or delayed packets and, consequently, increases the risk of them being dropped at the decoder level.

As previously mentioned, the encoder accounts for frames that may be dropped or arrive late at the decoder by omitting these at-risk frames from the referencing data structure. Therefore, when, e.g., a frame drop occurs or a packet(s) for a frame arrives late during decoding process 724, it has no effect on the decoder's ability to decode the frames subsequent to the dropped or delayed frame. The decoder can proceed to step 728 (e.g., executed using control circuitry 608 or control circuitry 634 of FIG. 6) and decode the frames subsequent to the dropped or delayed frame without causing increasing the overall latency of the end-to-end video delivery process. When the decoder completes the decoding of frames, it moves to step 730 and delivers the decoded frames to a video player for video display. In accordance with this embodiment, the decoder does not perform any special tasks or delay its standard process when a frame is dropped or delayed. Decoding process 724 simply moves on to decoding the next frame, which the encoder has preventively encoded to not depend on the frame that had a high risk of experiencing transmission and/or decoding issues.

Figure 8:
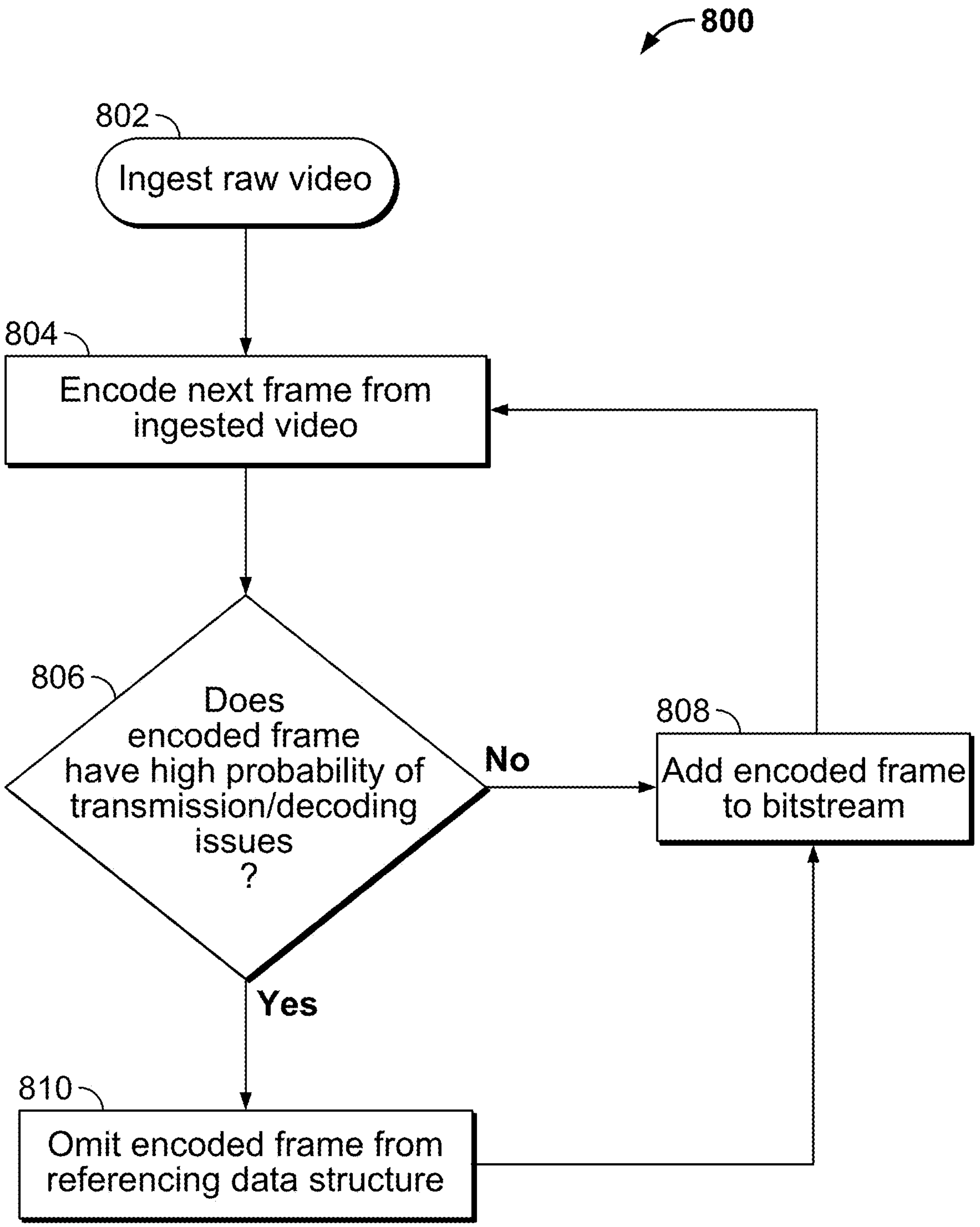
FIG. 8 depicts a flowchart of illustrative steps involved in determining whether an encoded frame should be omitted from the inter-prediction referencing structure, in accordance with some embodiments of the disclosure.

FIG. 8 depicts encoding process 800, which demonstrates how an encoder (e.g., video encoder 445 of FIG. 4 and/or video encoder 565 of FIG. 5) determines whether an encoded frame should be omitted from the inter-prediction referencing structure. In some embodiments, encoding process 800 is executed on control circuitry 634 of server 604 of FIG. 6. In such embodiments, raw video frames are received via communication circuitry 632 of FIG. 6. In some embodiments, encoding process 800 runs on control circuitry 608 of FIG. 6. In such embodiments, encoder 704 receives raw video frames via I/O circuitry 612 or communication circuitry 626 of FIG. 6. At step 802, the encoder ingests a raw video frame (e.g., from video capture module 435 of FIG. 4). At step 804, the encoder encodes the raw video frame.

In some embodiments, to minimize the amount of time needed to encode the video frame, the encoder uses a single-pass encoding process. In a single-pass encoding process the encoder encodes a scene without having full knowledge of many of the picture characteristics (e.g., motion, texture, lighting changes, etc.) for the current frame and upcoming frames. Without the ability to anticipate complex frames, the encoder, in some embodiments, will operate with lower compression efficiency and sub-optimal bit allocation. This can lead to the encoder over-allocating bits to a particular frame, thereby causing that particular frame to be at a higher risk of experiencing transmission and/or decoding issues. In embodiments where the encoder processes complex scenes, the encoded P-frames for these scenes may contain a large amount of data, even if the bit allocation is optimal and the compression is efficient.

To help prevent frames with large amounts of data from causing cascading errors later on, the encoder moves to step 806 (e.g., executed using control circuitry 608 or control circuitry 634 of FIG. 6), where it determines whether an encoded frame has a high probability of encountering transmission and/or decoding issues (e.g., frame drop, loss, or delay). In some embodiments, the encoder compares the bits per frame to a target or threshold bit size. The threshold bit size is determined by parameters that influence the transmission and decoding of frame data. In some embodiments, the threshold bit size is based on network conditions such as network bandwidth, network congestion, jitter, protocol type being used (e.g., UDP vs. TCP), or any other suitable network condition, or any combination thereof. The larger a frame is, the more packets are required to transmit it, or the more bits need to be allocated to each packet to transmit. The more packets that are sent, the higher the likelihood of the network's bandwidth becoming overloaded, leading to network congestion. If a network experiences congestion, larger packets may be dropped since they occupy more space in the network. Even if the packets of a large frame are not dropped, potential bandwidth limitations and network congestion may cause packets to experience transmission delays. A threshold bit size calculated based on network conditions, therefore, serves as a reliable predictor of whether a particular frame will encounter transmission issues. In some embodiments, the threshold bit size is adjusted based on changes in network conditions, e.g., if the network bandwidth increases, the threshold bit size increases.

In some embodiments, the threshold bit size is calculated based on the processing capabilities of the decoder. For example, if a frame containing a large amount of data is transmitted to a decoder with limited processing capabilities, there is a high probability that the decoder will experience decoding issues leading to the frame possibly being dropped or not being decoded in time. The threshold bit size may therefore also be calculated based on the processing capabilities to ensure that potential decoding issues are avoided.

In some embodiments, the threshold bit size is based on the frame content, type, and rate. For example, the encoder may receive feedback from the encoder indicating that frames of similar content, type, or rate were successfully transmitted and decoded. By setting the threshold bit size relative to previously successfully delivered frames, the threshold becomes an effective predictor of whether the current frame will also be delivered successfully.

In some instances, if the encoder determines at step 806 (e.g., executed using control circuitry 608 or control circuitry 634 of FIG. 6), that a frame has a high probability of experiencing transmission and/or decoding issues (e.g., because the frame is above the target bit size), it will reduce the target bit allocation for the subsequent frame. While this decreases the bit size for the subsequent frame (and therefore also picture quality), it increases the probability that it will be successfully transmitted and decoded.

If the encoder determines that an encoded frame has a low probability of experiencing a transmission issue, the encoder moves to step 808 (e.g., executed using control circuitry 608 or control circuitry 634 of FIG. 6) and adds the encoded frame to the bitstream. Between step 806 and 808, the frame may also be added to the referencing data structure. After completing step 808, the process returns to step 804 and begins encoding the next frame of the ingested raw video.

If the encoder determines that an encoded frame has a high probability of experiencing a transmission issue, the encoder moves to step 810 (e.g., executed using control circuitry 608 or control circuitry 634 of FIG. 6) and omits the encoded frame from the referencing data structure (e.g., referencing data structure 108 of FIG. 1). The encoder then adds the frame to the bitstream at step 808 and returns to step 804 to begin encoding the next frame of the ingested raw video.

By omitting the high-risk frame from the referencing data structure, no subsequent frames can depend on the high-risk frame and are therefore prevented from being affected by any potential transmission issues.

As demonstrated by the recursive configuration of encoding process 800, the encoder can iterate the process of omitting frames from the referencing data structure along a consecutive sequence of frames. However, in some embodiments, if the encoder persistently observes a sequence of frames exceeding the target bit size threshold, the encoder will switch to encoding an I-frame within the sequence of frames. In some approaches, the encoder determines that a threshold number of sequential frames have been omitted from the referencing data structure, which then triggers the encoder to encode an I-frame instead.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for encoding data for low-latency streaming, the method comprising:

encoding a plurality of frames of a video, wherein the plurality of the encoded frames of the video comprises at least one intra-coded key frame and at least one inter-coded frame;

adding a respective identifier of each encoded frame of a subset of the plurality of the encoded frames of the video to a reference frame data structure;

encoding a first frame as a first inter-frame, wherein the first inter-frame references at least one encoded frame of the reference frame data structure;

determining, based at least in part on properties of a stream, a probability of the first inter-frame being dropped during at least one of transmission or decoding of the first inter-frame;

based on the probability of the first inter-frame being dropped, causing the first inter-frame to be omitted from the reference frame data structure;

encoding a second frame of the video that is subsequent to the first frame by encoding the second frame as a second inter-frame, wherein the second inter-frame references at least one encoded frame of the reference frame data structure that omits the first inter-frame.

2. The method of claim 1, further comprising adding the plurality of encoded frames of the video to the stream, wherein the plurality of encoded frames of the video comprises the first inter-frame and the second inter-frame, and wherein the stream is transmitted to a decoder.

3. The method of claim 1, wherein the determining, based at least in part on the properties of the stream, the probability of the first inter-frame being dropped comprises:

determining current network conditions of a network that is transporting the stream;

determining a frame size threshold based on current network conditions;

comparing a size of the first inter-frame to the frame size threshold; and based on the size of the first inter-frame exceeding the frame size threshold, predicting that the first inter-frame will be dropped during at least one of the transmission or the decoding of the first inter-frame.

4. The method of claim 3, further comprising:

comparing a size of the second inter-frame to the frame size threshold; and based on the size of the second inter-frame exceeding the frame size threshold, predicting that the second inter-frame will be dropped during at least one of the transmission or the decoding of the second inter-frame; and in response to the prediction, encoding a third frame that is subsequent to the second frame as an intra-frame.

5. The method of claim 1, wherein the causing the first inter-frame to be omitted from the reference frame data structure is further based on:

determining a probability that at least one of the transmission or decoding of the first inter-frame will be delayed.

6. The method of claim 1, wherein the first frame is in the middle of a scene of the video.

7. The method of claim 1, wherein the reference frame data structure is a reference frame buffer comprising:

each frame of the subset of the plurality of frames; and the respective identifier of each of the plurality of frames.

8. The method of claim 1, wherein the at least one intra-coded key frame is an I-frame and the at least one inter-coded frame is at least one of a P-frame or B-frame.

9. The method of claim 1, wherein in response to determining, based at least in part on the properties of the stream, the probability of the first inter-frame being dropped during at least one of the transmission or the decoding of the first inter-frame, the method further comprises:

assigning an identifier to the first inter-frame indicating that it is unavailable to be used as a reference frame for subsequent frame encodings.

10. The method of claim 1, wherein the subset of the plurality of the encoded frames of the video comprises encoded frames that have been determined to be suitable reference frames.

11. A system for encoding data for low-latency streaming, the system comprising:

memory circuitry comprising a reference frame data structure configured to store a plurality of frames;

control circuitry coupled to the memory circuitry, wherein the control circuitry is configured to:

encode a plurality of frames of a video, wherein the plurality of the encoded frames of the video comprises at least one intra-coded key frame and at least one inter-coded frame;

add a respective identifier of each encoded frame of a subset of the plurality of the encoded frames of the video to the reference frame data structure;

encode a first frame as a first inter-frame, wherein the first inter-frame references at least one encoded frame of the reference frame data structure;

determine, based at least in part on properties of a stream, a probability of the first inter-frame being dropped during at least one of transmission or decoding of the first inter-frame;

based on the probability of the first inter-frame being dropped, cause the first inter-frame to be omitted from the reference frame data structure;

encode a second frame of the video that is subsequent to the first frame by encoding the second frame as a second inter-frame, wherein the second inter-frame references at least one encoded frame of the reference frame data structure that omits the first inter-frame.

12. The system of claim 11, wherein the control circuitry is further configured to: add the plurality of encoded frames of the video to the stream, wherein the plurality of encoded frames of the video comprises the first inter-frame and the second inter-frame, and wherein the stream is transmitted to a decoder.

13. The system of claim 11, wherein the control circuitry configured to determine, based at least in part on the properties of the stream, the probability of the first inter-frame being dropped by:

determining current network conditions of a network that is transporting the stream;

determining a frame size threshold based on current network conditions;

comparing a size of the first inter-frame to the frame size threshold; and based on the size of the first inter-frame exceeding the frame size threshold, predicting that the first inter-frame will be dropped during at least one of the transmission or the decoding of the first inter-frame.

14. The system of claim 13, wherein the control circuitry is further configured to:

compare a size of the second inter-frame to the frame size threshold; and based on the size of the second inter-frame exceeding the frame size threshold, predict that the second inter-frame will be dropped during at least one of the transmission or the decoding of the second inter-frame; and in response to the prediction, encode a third frame that is subsequent to the second frame as an intra-frame.

15. The system of claim 11, wherein the control circuitry is configured to cause the first inter-frame to be omitted from the reference frame data structure is further based on:

determining a probability that at least one of the transmission or decoding of the first inter-frame will be delayed.

16. The system of claim 11, wherein the first frame is in the middle of a scene of the video.

17. The system of claim 11, wherein the reference frame data structure is a reference frame buffer comprising:

each frame of the subset of the plurality of frames; and the respective identifier of each of the plurality of frames.

18. The system of claim 11, wherein the at least one intra-coded key frame is an I-frame and the at least one inter-coded frame is at least one of a P-frame or B-frame.

19. The system of claim 11, wherein in response to determining, based at least in part on the properties of the stream, the probability of the first inter-frame being dropped during at least one of the transmission or the decoding of the first inter-frame, the control circuitry is further configured to:

assign an identifier to the first inter-frame indicating that it is unavailable to be used as a reference frame for subsequent frame encodings.

20. The system of claim 11, wherein the subset of the plurality of the encoded frames of the video comprises encoded frames that have been determined to be suitable reference frames.

* * * * *